(12) United States Patent
Bruening

(10) Patent No.: US 7,024,846 B2
(45) Date of Patent: Apr. 11, 2006

(54) HEADER FOR HARVESTING STALK CROPS

(75) Inventor: Ulrich Bruening, Coesfeld (DE)

(73) Assignee: Maschinenfabrik Kemper GmbH & CO KG, Stadtlohn (DE)

( * ) Notice: Subject to any disclaimer, the term of this patent is extended or adjusted under 35 U.S.C. 154(b) by 0 days.

(21) Appl. No.: 10/987,422

(22) Filed: Nov. 12, 2004

(65) Prior Publication Data

US 2005/0132687 A1   Jun. 23, 2005

(30) Foreign Application Priority Data

Dec. 20, 2003   (DE) ................................ 103 60 299

(51) Int. Cl.
*A01D 45/02*   (2006.01)
(52) U.S. Cl. .......................................................... 56/51
(58) Field of Classification Search ................... 56/51, 56/53, 94
See application file for complete search history.

(56) References Cited

U.S. PATENT DOCUMENTS 3,178,873 A * 4/1965 Meyer ........................ 56/27.5
4,117,653 A * 10/1978 Tarver, Jr. .................... 56/13.6
4,502,267 A * 3/1985 Klinner ....................... 56/13.6
4,926,263 A * 5/1990 Yokota ........................ 358/474
6,032,444 A * 3/2000 Herron et al. ................. 56/60

FOREIGN PATENT DOCUMENTS

EP   1 234 493   2/2002

* cited by examiner

*Primary Examiner*—Thomas B. Will
*Assistant Examiner*—Alicia Torres

(57) ABSTRACT

A header is equipped with a plurality of mowing and take-in devices for cutting and conveying plants. Associated with each of mowing and take-in device is a conveyor for receiving and conveying plant parts, especially corn ears, possibly separated from the plants, and return devices for returning the plant parts into the plant stream conveyed in the header. Each conveyor includes a chute mounted at an edge of the associated mowing and take-in device for receiving plant parts separated from harvested plants. The return device has a section extending into the chute for deflecting the plant parts back into the plant stream conveyed in the header.

3 Claims, 2 Drawing Sheets

HEADER FOR HARVESTING STALK CROPS

FIELD OF THE INVENTION

The invention relates to a header for mowing stalk crops, with a mowing and take-in device for cutting and conveying plants, to which are allocated a conveyor means for receiving and conveying plant parts, especially ears, possibly separated from the plants, and a return devices for returning the plant parts into the plant stream conveyed in the header.

BACKGROUND OF THE INVENTION

Headers of the type mentioned in the introduction are used in agriculture to cut stalk crops, e.g., corn, from a field and to feed these crops to a field chopper carrying the header, where the plants are chopped and discharged into a receptacle on a trailer. Such headers usually have a number of row-independent mowing and take-in devices arranged laterally one next to the other in the form of drums rotating about the vertical axis with indentations or notches distributed around their edges, in which the plant stalks are held, and mowing disks, which are mounted underneath the drums and which are used for cutting the plant stalks from the ground.

If the plants are very ripe, the ears can be separated from the stalk just by slight vibrations. Such vibrations occur especially when the plant is received by the header or when it is deflected in its further path through the header. The goal is to let as few ears fall to the ground as possible and thus be lost to the harvesting process.

To prevent such losses, EP 1 234 493 A proposes to mount catches on the top side of the mowing and take-in devices, which grip the ears that are separated from the plant stalks during the harvesting process or during transport through the header and which fall onto the top side of the mowing and take-in devices. The plant stalks are pushed downwards by covers from the top sides of the mowing and take-in devices and are led back into the crop stream. This invention is suitable essentially for headers with mowing and take-in devices that have flat top sides. In addition, a cover of the mowing and take-in devices is required, which can have a disadvantageous effect on the conveyance action of the mowing and take-in device, because the covered regions of the mowing and take-in device do not have a transporting effect on the crops.

The task forming the basis of the invention is to create a compact header for mowing stalk crops, in which the ear losses are held low and the disadvantages mentioned above are not present at all or only to a minimal degree.

SUMMARY OF THE INVENTION

According to the present invention, there is provided an improved header arrangement for saving ears of corn that become separated from the corn stalks during harvesting.

It is proposed to allocate to the mowing and take-in device a chute, which is located at one edge of the mowing and take-in device, as conveyor means for receiving and conveying ears or other plant parts possibly separated from the plants. Parts possibly falling from a plant, such as ears, are forced into the chute, e.g., by centrifugal force or by the force of gravity for a suitably shaped top side of the mowing and take-in device. A region of the return devices intersects a downstream region of the chute. Therefore, the plant parts are taken from the chute and transferred into the plant stream conveyed in the header, so that they are not lost to the harvesting process.

Because it is sufficient when the return devices interact only with the chute, which is located at the edge of the mowing and take-in device, a scraping element, which extends up to the rotational axis of the mowing and take-in device, is no longer required. The return devices can thus be small and light, can also enable the top sides of the mowing and take-in devices to have shapes other than flat, and do not negatively affect the conveyance effect of the drum, because it is not necessary that they cover these devices.

The chute can also be formed by elements that move with the mowing and take-in device during harvesting work by being connected rigidly to the device, for example. The co-moving elements of the chute form at least its inner side, while the outer side of the chute also usually moves with the mowing and take-in device. However, it would also be conceivable to connect the outer side of the chute to the frame of the header.

The return devices are preferably arranged on the rear side of the mowing and take-in device, where a cross auger chute is also located, in which the ears and other plant parts are brought from the chute. If a conveyor chute with an arbitrary conveying direction is located at another point of the header, e.g., at the front side, the return devices can discharge the plants to a corresponding suitable position in the conveyor chute.

The top side of the mowing and take-in device could be flat. The ears could then be conveyed into the chute by centrifugal force and/or suitable catches mounted at the top side and shaped, e.g., with a following curve in the direction of rotation. In another embodiment, the top sides of the moving and take-in devices bulge upwards at least in the edge region, e.g., taper, so that plant parts falling onto this region are led by the force of gravity into the chute, which is located at its outer edge. One advantage is that this configuration realizes a conveying effect that is independent of the speed of the mowing and take-in device.

BRIEF DESCRIPTION OF THE DRAWINGS

Two embodiments of the invention described are shown in the drawings.

DESCRIPTION OF THE PREFERRED EMBODIMENT

Figure 1:
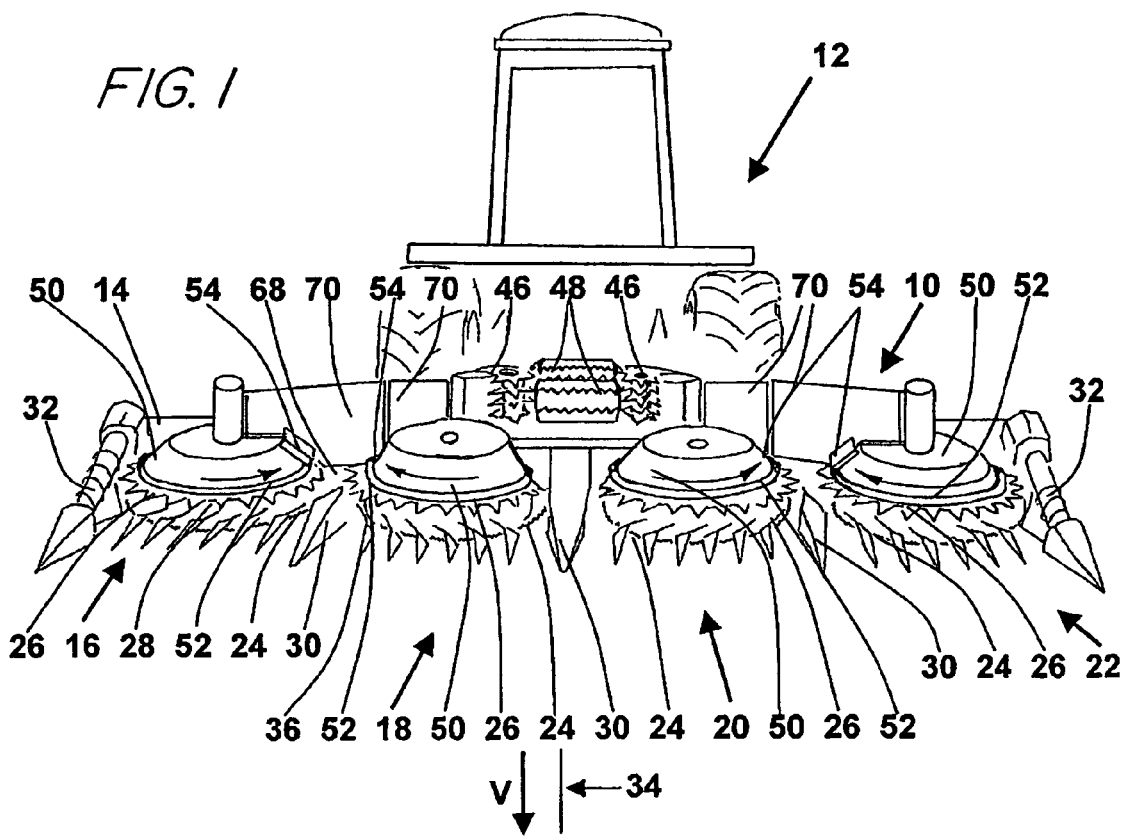
FIG. 1 is a perspective front view of a header for mowing stalk crops and a field chopper carrying it.

FIG. 1 is a front perspective view of a header 10 for mowing stalk crops, especially corn. The header 10 is mounted on a self-propelled field chopper 12 and is moved by it over a field to be harvested in a driving direction V.

The header 10 has a frame 14, on which four mowing and take-in devices 16, 18, 20, 22 are mounted laterally one next to the other. The mowing and take-in devices 16–22 are each assembled from a lower cutting disk 24 that can be set in rotation and conveyor disks 26, which are arranged coaxially above the cutting disk and which can be set in rotation.

The cutting disks 24 are equipped with sharp teeth at the edge or are sharpened in some other way to separate the plant stalks from the stubble remaining in the ground. The stalks are held in indentions or notches 28 of the conveyor disks 26 and are transported as described below to the field chopper 12.

Between the mowing and take-in devices 16–22, there are corresponding stalk dividers 30 to deflect the plants to the side and if necessary to bring them into the intersecting region of the mowing and take-in devices 16–22. The stalk divider 30 between the middle mowing and take-in devices 18, 20 is diamond-shaped and extends backwards up to a location directly in front of the take-in rollers 48 of the field chopper 12. Driving stalk lifting augers 32 are located on the two outer sides of the header 10. Smaller stalk dividers 36 are arranged on the front sides of the mowing and take-in devices 16–22.

The working width of each mowing and take-in device 16–22 corresponds to two rows, i.e., approximately 1.5 m. The header 10 can thus harvest 8 rows of corn simultaneously.

During harvesting work, the mowing and take-in devices 16–22 turn in the directions indicated by the arrows. The inner mowing and take-in devices 18, 20 adjacent to the longitudinal center plane 34 of the header 10 thus first convey the plants outwards and to the rear, while the outer mowing and take-in devices 16, 22 rotate in the opposite sense to the adjacent mowing and take-in devices 18, 20. The outer mowing and take-in devices 16, 22 transfer their crops approximately in the middle between the rotational axes of the mowing and take-in devices 16, 18 and 20, 22, respectively, to the inner mowing and take-in devices 18, 20. At the rear side of the inner mowing and take-in devices 18, 20, the crops are transferred to slope conveyor drums 46, which rotate about axes inclined slightly forward and overcome the height difference between the base of the header 10 and the subsequent take-in rollers 48 of the take-in chute of the field chopper 12. At the rear side of the inner mowing and take-in devices 18, 20, the crops are thus conveyed in cross auger chutes 68, which are limited at the rear by a rear wall 70 of the header 10 connected tightly and rigidly to the frame 14. The outer regions of the rear wall 70 extend up to the vicinity of the rotational axes of the outer mowing and take-in devices 16, 22.

Covers 50 with the shape of a truncated cone are arranged at the top sides of the mowing and take-in devices 16–22. The covers 50 thus taper upward conically in their outer region and have a flat inner region. On the outer edge of the foot of the covers 50, U-shaped chutes 52 opening upward are arranged directly above the topmost conveyor disk 26 of the mowing and take-in devices 16–22. Return devices 54, which have sections engaging in the chutes 52, are mounted on the rear wall 70 of the header 10.

Figure 2:
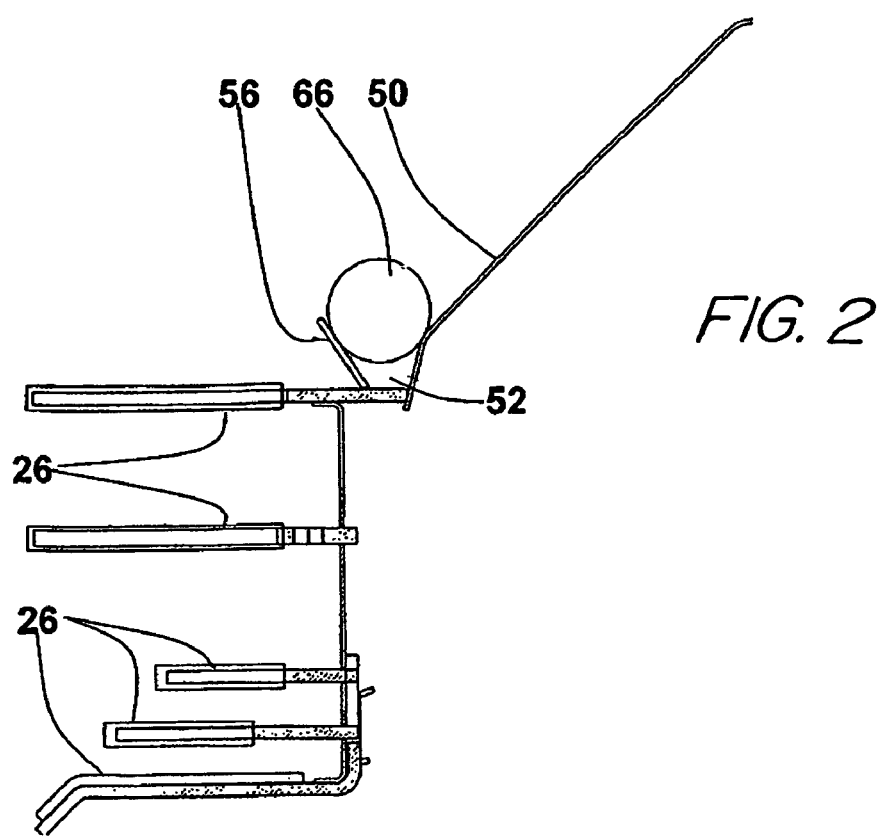
FIG. 2 is a vertical cross section taken through a first embodiment of the take-in and mowing devices of the header shown in FIG. 1.

FIG. 2 shows a section through a first embodiment of one of the mowing and take-in devices 16–22. At the foot of the tapered cover 50, the chute 52 is formed inwards by the lower region of the cover 50 and outwards by a separate ring 56, which is inclined diagonally upward and outward and which is connected to the topmost conveyor disk 26.

Figure 3:
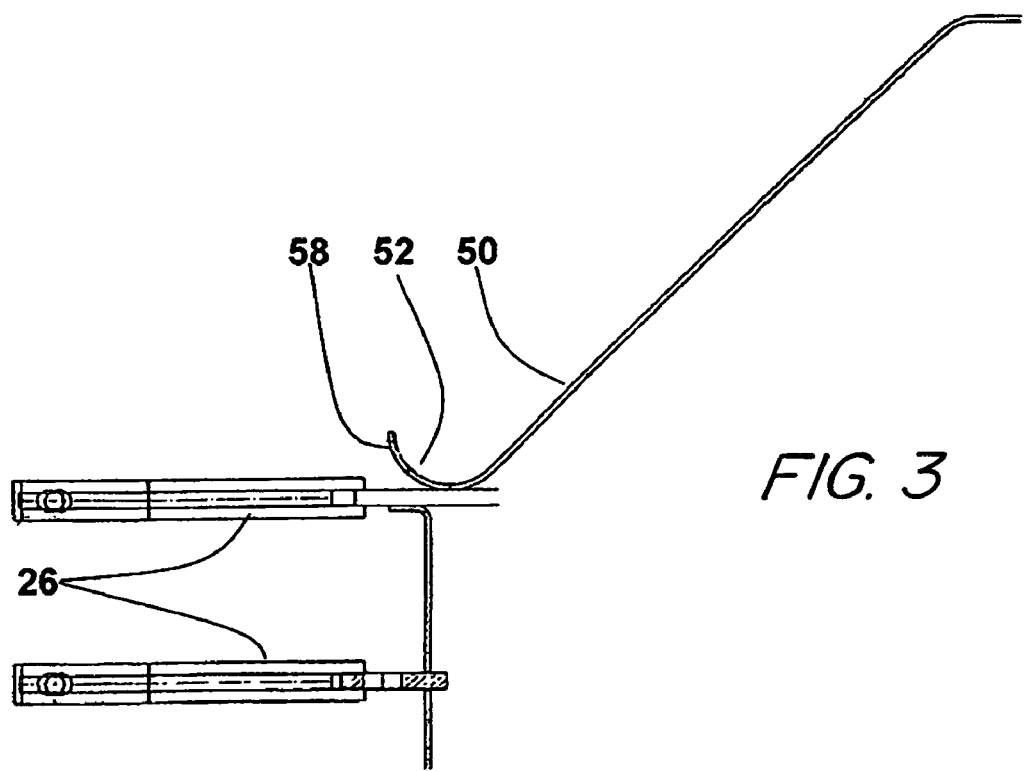
FIG. 3 is a vertical cross section through a second embodiment of the take-in and mowing devices of the header shown in FIG. 1.

The embodiment according to FIG. 3 has a chute 52, which is also formed inwards by the lower region of the cover 50 and outwards by an upwardly extending edge 58 of the cover 50.

Figure 4:
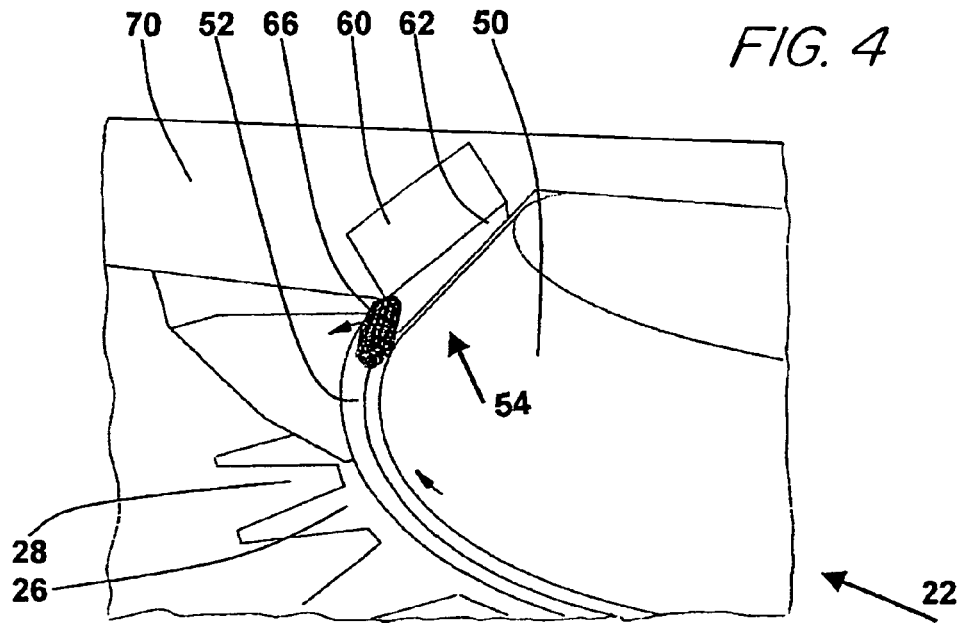
FIG. 4 is a perspective view of the downstream part of the chute and the return devices of the header shown in FIG. 1, which lift plant parts from the chute and return them into the crop stream.

FIG. 4 is a perspective view of the outer mowing and take-in device 22 shown on the right in FIG. 1 and the adjacent part of the frame 14. One of the return devices 54 is associated with the outer mowing and take-in device 22 and consists of an angled sheet. Specifically, the return device 54 includes a first section 60, which is mounted on the region of the rear wall 70 of the frame 14 extending above the mowing and take-in device 22 and a second section 62, which is angled to the front from the section 60 and which extends into the chute 52. Similar return devices 54, which are mounted on the rear wall 70, are allocated to the other mowing and take-in devices 16–20. The return devices 54 could also be allocated to the middle mowing and take-in devices 18, 20 in the rearward region of the middle grain divider 30 in front of the cross auger chute 68, so that they have as small a negative effect on the crop stream in the cross auger chute 68 as possible.

The function of the chute 52 used as a conveyor for receiving and conveying plant parts possibly separated from plants and the return devices 54 is described in the following. When the plants are cut from the ground by the cutting disk 24 with the plant held in one of the indentions or notches 28 of the conveyor disks 26, or when the plant is transported further through the header 10, especially when deflected, if ears 66, e.g., ears of corn, or other plant parts separate from the stalks of the plants due to the resulting vibrations or accelerations, they fall on the cover 50. There they slide into the conical outer region of the cover 50 into the chute 52 due to the force of gravity. If the ears or plant parts fall onto the inner region of the cover 50, they move outward due to centrifugal force and then slide downwards on the conical outer region. In addition, they are scraped downwards by the cover 50 through the adjacent region of the rear wall 70 in the outer mowing and take-in devices 18, 22. The ears 66 are thus led into the chute 52, as shown in FIG. 4.

Directly in front of the cross auger chute 68, the sections 62 of the return devices 54 lift the ears 66 or other plant parts like a shovel back out of the chute 52. They fall into the cross auger chute 68 and are conveyed with the stream of the other harvested plants into the field chopper 12. Because the chutes 52 and the scraping means 54 are present, the regions of the rear wall 70, which extend above the outer mowing and take-in devices 16, 22, could also be eliminated. Through the use of the chutes 52 and scraping means 54, the use of pre-tensioned straps is unnecessary.

Having described the preferred embodiment, it will become apparent that various modifications can be made without departing from the scope of the invention as defined in the accompanying claims.

The invention claimed is:

1. In a header for mowing stalk crops equipped with at least one mowing and take-in device for cutting and conveying plants, a conveyor associated with said at least one mowing and take-in device for receiving and conveying plant parts, especially ears, and a return device for returning the plant parts into a plant stream conveyed in the header, the improvement comprising: said conveyor means including an upwardly opening chute, in which plant parts separated from harvested plants are led; and said return device having a section extending into said chute wherein said at least one of said mowing and take-in device has a top which converges upwardly with said chute being located at a lower edge of said top, so that ears falling onto said top are led into said chute due to the effect of the force of gravity.

2. The header, as defined in claim 1, wherein said at least one mowing and take-in device includes a toothed disc; and a bottom of said chute being formed at least partially by said toothed disc of said at least one mowing and take-in device.

3. The header, as defined in claim 1, wherein said return device is arranged at the rear side of said mowing and take-in device.

* * * * *